Patented Feb. 22, 1938

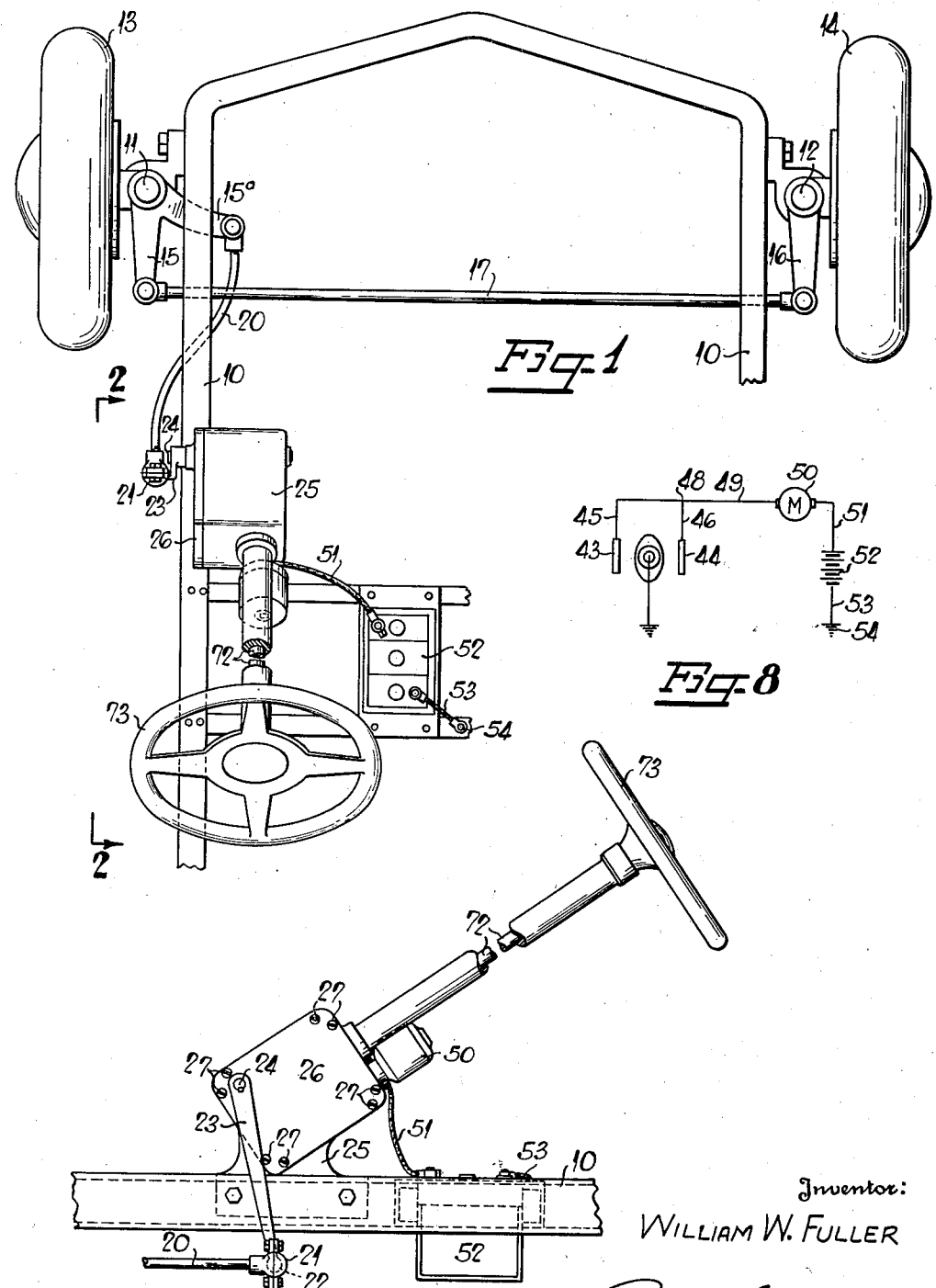

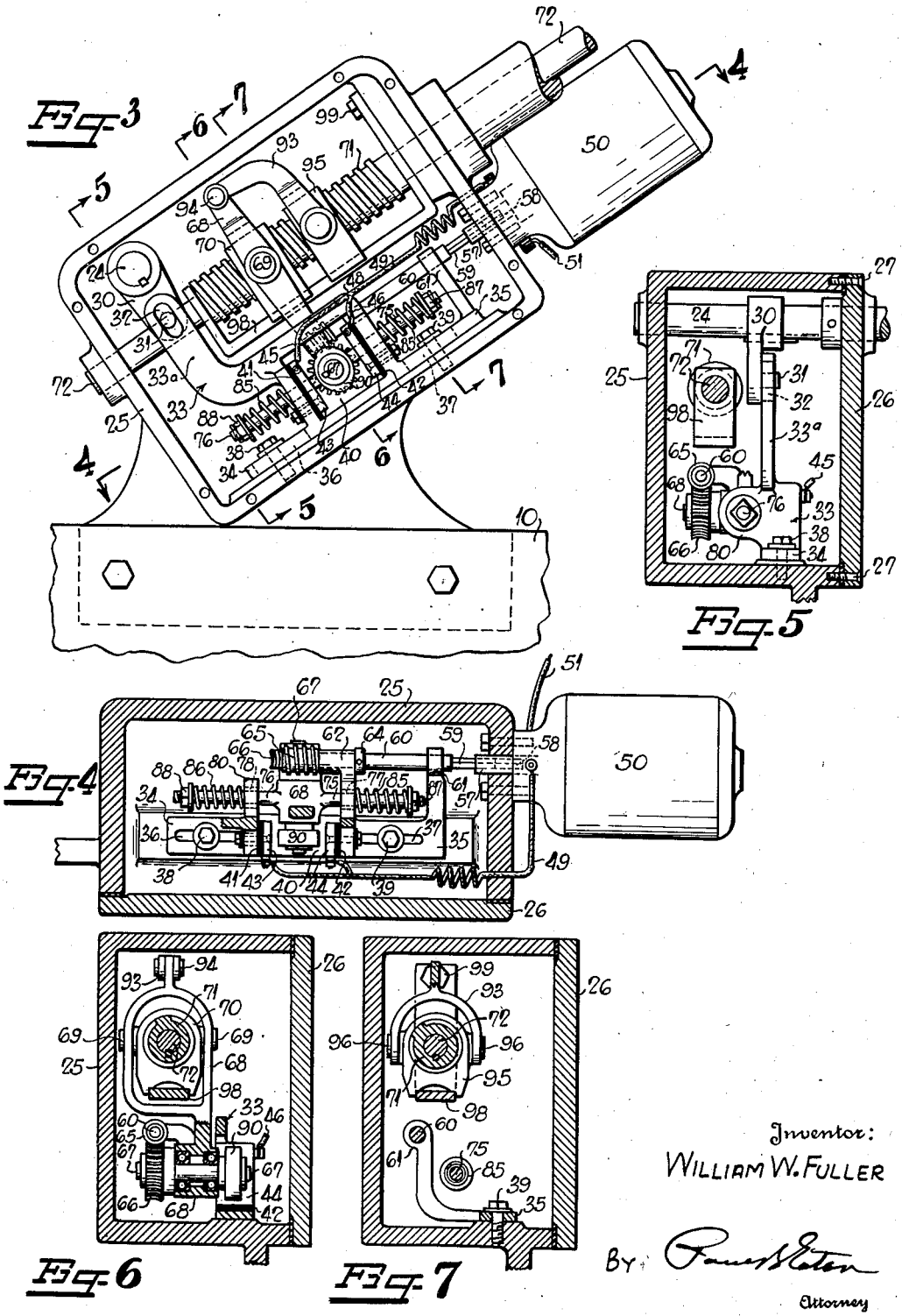

2,109,418

UNITED STATES PATENT OFFICE 2,109,418

POWER STEERING APPARATUS FOR VEHICLES

William W. Fuller, Norfolk, Va., assignor to Hermoine Fuller, Norfolk, Va.

Application March 6, 1937, Serial No. 129,424

6 Claims. (Cl. 180—79.1)

This invention relates to a steering apparatus for automobiles, trucks, and the like, and more especially to an apparatus which is adapted to be associated with the steering apparatus of a conventional automobile or truck whereby a slight movement of the steering wheel by the operator will cause a power steering mechanism to be brought into action to assist the steering of the automobile. It is a well known fact that when the steering of an automobile has to be accomplished purely through manual means, the energy required to be applied to the steering wheel in order to produce a certain movement of the pilot wheels of the automobile, is excessive at times and requires much effort on the part of the driver.

It is therefore, an object of this invention to provide a power steering apparatus associated with the conventional steering mechanism which will assist the driver in steering the automobile but at the same time will not interfere with the manual operation should it be desired to disconnect the power steering means.

It is a further object of this invention to provide a power steering apparatus for automotive vehicles, comprising a series of driving links for operating the pilot wheels of an automotive vehicle and a movable lever threadably secured to the lower end of the steering column with power driven means on said lever for impulsively operating the series of driving links which, in turn, operate the pilot wheels of the automotive vehicle.

In my invention I have provided a cam secured to the lower end of a suitable lever which is threadably attached to the lower end of the steering column. This cam is driven by any suitable means such as an electric motor which receives its energy from a storage battery; however, it should be noted that any conventional driving means may be employed such as a flexible drive shaft which might be connected to some moving part of the automobile. This cam is mounted eccentrically in a yoke which is attached to the series of driving links and as it is driven, it impels the yoke one way or the other to operate the pilot wheels of the automobile in the desired manner.

It is still a further object of this invention to provide a pivoted lever threadably attached to the lower end of the steering column of an automotive vehicle and having a cam means on the lower end thereof for impelling the pilot wheels of the vehicle in the desired direction, and said lever having its upper end pivotally connected to a nut which is likewise threadably secured to the lower end of the steering shaft which acts as a shock absorber to prevent any kick back on the steering wheel should the pilot wheels encounter an obstruction which would place an excessive strain upon the steering links.

Some of the objects of the invention having been stated other objects will appear as the description proceeds when taken in connection with the accompanying drawings, in which:—

Figure 1 is a plan view of the front portion of the chassis of an automotive vehicle showing my invention attached thereto;

Figure 2 is an elevation taken along the line 2—2 in Figure 1;

Figure 3 is an elevation similar to the central portion of Figure 2 but being on an enlarged scale and having the cover for the steering housing removed to show the parts disposed therein;

Figure 4 is a sectional plan view taken along the line 4—4 in Figure 3;

Figure 5 is a sectional view taken along line 5—5 in Figure 3;

Figure 6 is a sectional view taken along line 6—6 in Figure 3;

Figure 7 is a sectional view taken along line 7—7 in Figure 3;

Figure 8 is a schematic wiring diagram of the invention.

Referring more specifically to the drawings, the numeral 10 denotes the chassis of a motor vehicle which has pivotally secured thereto as at 11 and 12, pilot wheels 13 and 14 respectively. These pilot wheels are operated by suitable levers 15 and 16 which levers have the free ends thereof connected to each other by means of cross rod 17. The lever 15 has another arm 15a integral therewith to which is secured one end of steering link 20, the other end of said link having a socket 21 thereon in which is mounted ball 22. This ball is disposed on the lower end of lever 23 which has its other end fixedly secured to shaft 24. The ends of shaft 24 are supported for oscillation by housing 25 and cover 26, which cover is secured to the housing by means of screws 27 (Fig. 5).

Fixedly secured to shaft 24 within the housing 25 is a downwardly extending lever 30 having a pin 31 projecting from the lower end thereof which pin is adapted to fit into a suitable slot 32 in upwardly extending leg 33a of slide yoke 33. This yoke has outstanding legs 34 and 35 integral with the base portion thereof which have slots 36 and 37 respectively, therein. Suitable stud bolts 38 and 39 penetrate these slots and hold the slides in position on the bottom of the housing 25, but allow the slide to have longitudinal movement within the housing.

The yoke 33 has an opening 40 therein, the proximate upwardly projecting sides thereof having insulating strips 41 and 42 secured thereto on top of which are mounted metallic bars 43 and 44 respectively. Connected to these bars respectively, are wires 45 and 46 which are joined to each other as at 48 and from point 48 a wire 49 leads to one side of motor 50.

Leading from the other side of motor 50 is the wire 51, said wire having its other end secured to one side of a battery 52 which battery has a ground wire 53 leading to a suitable ground 54. In normal position, as shown, the contact bars 43 and 44 are not grounded, consequently, the motor 50 will not be in operation; however, when either of the bars are grounded the motor will be placed in operation to perform functions which will be presently described.

The motor 50 has a motor share 57 which extends into the housing 25. The end of the shaft has a squared female portion 58 therein into which a squared male portion 50 of shaft 60 is adapted to slide. The shaft 60 is rotatably mounted in bearings 61 and 62 which are integral with the slide 33. A suitable collar 64 is secured around the shaft 60 directly on the upper side of the bearing 62 to hold the shaft 60 in its proper position. The lower end of shaft 60 has a worm 65 thereon which meshes with a worm gear 66, said worm gear being fixedly secured on the end of shaft 67. The shaft 67 is rotatably mounted in the lower end of a suitable lever 68 which is pivotally secured intermediate its ends as at 69 to the opposed sides of block member 70. This block member is interiorly threaded and fits on threaded portion 71 which portion is secured to the lower end of steering column 72. The steering column 72 has a suitable steering wheel 73 secured to the upper end thereof.

In order to prevent unnecessary rotation of the lever 68 and also to form a means for restoring the parts to normal position, prongs 75 and 76 have been provided which extend at right angles from the lower end of lever 68 and are formed integral therewith. These prongs penetrate suitable holes 77 and 78 in members 62 and 80, which members are a part of the slide 33. It will be noted that the holes 77 and 78 are slightly larger than the prongs 75 and 76 to allow limited rotative movement of the lower end of lever 68 about pivot 69. The prongs 75 and 76 have compression springs 85 and 86 therearound which springs have the ends thereof normally pressed against members 62 and 80 respectively, by nuts 87 and 88 which are placed on the ends of the prongs. Since the springs 85 and 86 are of equal strength it is evident that the upwardly extending portion of lever 68 will be held midway between the projections 62 and 80. This, of course, will cause the shaft 67 and cam 90 to be equidistant from the contact bars 43 and 44 when the parts are in normal position.

By referring to Figures 3, 4 and 6, it will be seen that the shaft 67 has a suitable cam 90 fixedly secured thereon which is adapted to operate within the hole 40 and between the contact bars 43 and 44. Let us suppose that it is desired to turn the pilot wheels 13 and 14 to the right in the conventional manner, which will force the interiorly threaded collar 70 upwardly on the threaded portion 71 in Figure 3. This will cause a greater stress to be exerted on spring 85 than on spring 86 and thereby throw the cam 90 in a position so that it will engage the contact bar 44. Of course when this is done a ground will be formed and the motor 50 will be placed into operation. Since the motor 50 will rotate the shaft 60, worm 65, worm gear 66, shaft 67 and the cam 90, then it is evident that the slide 33 will be pushed to the right in Figures 3 and 4, thereby causing the shaft 24 and its associated lever 30 to be rotated in a counter-clockwise manner, in Figures 2 and 3. This rotation will likewise cause the lever 23 to move in a counter-clockwise manner in Figure 2, which, in turn, will rotate the pilot wheels 13 and 14 to the right or in a clockwise manner in Figure 1. When the driver ceases to turn the steering wheel 73 the springs 85 and 86 will restore the yoke or slide 33 to a central position as shown in the drawings, at which time the cam 90 will not be contacting either of the bars and therefore, the motor will not be running. Likewise, if it is desired to direct the pilot wheels 13 and 14 in the opposite direction, then the reverse movement of the steering wheel 73 will be made thereby forcing the cam 90 into contact with contact bar 73. If, for any reason the motor or battery should become ineffective or inoperable then the same results can be obtained by turning the steering wheel to the right or to the left but the assistance of the cam 90 will not be present in this operation. Instead, the steering will take place entirely by virtue of the manual power exerted upon the steering wheel. The cam 90 is constructed with two high points so that when it is in operation the yoke 33 is given two pulsations per revolution of the shaft 67. If desired, the number of high points may be varied to accommodate the particular vehicle upon which the apparatus may be installed.

It should be noted that the squared end 59 of shaft 60 is allowed to move longitudinally in the cavity 58, as the slide 33 moves to the right or to the left in Figures 3 and 4. In order to prevent any kick back upon the steering wheel during the operation of the cam 90, a link 93 has been pivoted as at 94 to the upper end of lever 68. The other end of this link is forked and place astride a second interiorly threaded block 95 which is mounted upon threaded portion 71. This forked end is pivotally secured to this block as at 96. When the cam 90 is in operation and exerting pressure against one of the bars 43 or 44, the lever 68 is allowed a slight pivotal or rotative motion about the pivot 69, which movement alone, would have a tendency to produce a counter movement or a kick back upon the steering wheel. In order to lessen this kick back a second interiorly threaded block 95 has been provided which will be normally forced in the opposite direction from that which the block 70 is forced when the cam 90 is in operation to thereby lock the steering column in position during this temporary kickback and cause all of the force exerted by cam 90 to be transmitted and utilized toward the movement of the pilot wheels. The lower ends of the interiorly threaded blocks 70 and 95 are adapted to fit astride a suitable U-shaped slide member 98 which has the lower upstanding leg thereof encircling the lower portion of the steering column 72 and has its upper upstanding leg encircling another portion of the steering column and also secured as at 99 to the interior of the housing 25. This slide allows blocks 70 and 95 to have longitudinal movement relative to steering column 72 but prevents any rotative movement.

It is thus seen that I have provided a steering mechanism which is reduced to a very simple mechanical device. In other words, it is the same as the present hand power steering plus a cam to do the pushing and a means for preventing a kick back on the steering wheel.

In the drawings and specification there has been set forth a preferred embodiment of the invention, and although specific terms are employed, they are used in a generic and descriptive sense only, and not for purposes of limitation, the scope of the invention being set forth in the appended claims.

I claim:

1. Steering apparatus for self-propelled vehicles comprising manual steering means, a casing, a yoke slidably mounted in the casing and responsive to the manual steering means, a shaft in said casing and connected by a plurality of links to the wheels of the vehicle for steering the same, an arm on said shaft, a pivotal connection between the yoke and the arm, a member mounted on the steering means and movable into engagement with the yoke to steer the vehicle, and means in the casing controlled by the manual steering means for counter-acting the resistance offered by the wheels of the vehicle when the member is moved into contact with said yoke to steer said wheels.

2. Steering apparatus for an automotive vehicle having manually operable steering means including a steering column and a manually operable steering wheel on said steering column and pilot wheels, a member mounted on said steering column and movable by rotation of the steering wheel, a forked yoke movable by the member on said steering column, a plurality of links connecting said yoke and said pilot wheels, a driven shaft carried by said member on the steering column and having an eccentrically mounted cam thereon whereby upon movement of the yoke by the movement of the steering wheel one portion of said yoke will be placed in contact with said cam to move the yoke and the pilot wheels connected thereto.

3. Steering apparatus for an automotive vehicle having manually operable steering means including a steering column and a manually operable steering wheel on said steering column and pilot wheels, a member mounted on said steering column and movable by rotation of the steering wheel, a forked yoke movable by the member on said steering column, a plurality of links connecting said yoke and said pilot wheels, a driven shaft carried by said member on the steering column and having an eccentrically mounted cam thereon whereby upon movement of the yoke by the movement of the steering wheel one portion of said yoke will be placed in contact with said cam to move the yoke and the pilot wheels connected thereto, and an electric motor for driving said shaft and having a circuit, one side of said circuit having contact points in parallel on each side of said yoke engageable by said cam when the yoke is moved in either direction to contact the cam, and the other side of said circuit including said shaft, whereby when the yoke is moved by the manual steering means into contact with the cam the motor will be energized to drive the cam and move the yoke in the direction it is initially moved by the manual steering means.

4. Steering apparatus for an automotive vehicle having manually operable steering means including a steering column and a manually operable steering wheel on said steering column and pilot wheels, a member mounted on said steering column and movable by rotation of the steering wheel, a forked yoke movable by the member on said steering column, a plurality of links connecting said yoke and said pilot wheels, a driven shaft carried by said member on the steering column and having an eccentrically mounted cam thereon whereby upon movement of the yoke by the movement of the steering wheel one portion of said yoke will be placed in contact with said cam to move the yoke and the pilot wheels connected thereto, and means automatically operable upon cessation of movement of the steering wheel for returning said shaft and cam to midway position between the two portions of the yoke.

5. Steering apparatus for an automotive vehicle having manually operable steering means including a steering column and a manually operable steering wheel on said steering column and pilot wheels, a member mounted on said steering column and movable by rotation of the steering wheel, a forked yoke movable by the member on said steering column, a plurality of links connecting said yoke and said pilot wheels, a driven shaft carried by said member on the steering column and having an eccentrically mounted cam thereon whereby upon movement of the yoke by the movement of the steering wheel one portion of said yoke will be placed in contact with said cam to move the yoke and the pilot wheels connected thereto, an electric motor for driving said shaft and having a circuit, one side of said circuit having contact points in parallel on each side of said yoke engageable by said cam when the yoke is moved in either direction to contact the cam, and the other side of said circuit including said shaft, whereby when the yoke is moved by the manual steering means into contact with the cam the motor will be energized to drive the cam and move the yoke in the direction it is initially moved by the manual steering means, and means automatically operable upon cessation of movement of the steering wheel for returning said shaft and cam to midway position between the two portions of the yoke.

6. Steering apparatus for the pilot wheels of a motor vehicle, comprising a threaded steering column, a pair of spaced members pivoted to each other at one end and threadably mounted on the steering column, a driven impulse delivering member carried by the free end of one of said members disposed on said steering column, a slidable member having an opening therein for receiving said impulse delivering member, a driving connection between said slidable member and the pilot wheels whereby when the steering column is rotated the impulse delivering member will be moved against one of the walls of said opening to move the slidable member and the pilot wheels, and means for normally forcing the slidable member to a position where the pilot wheels are directed directly forward of the vehicle.

WILLIAM W. FULLER.